May 12, 1964   C. D. MACY ETAL   3,132,950
PROCESS AND APPARATUS FOR PRODUCING SKINLESS SAUSAGES
Filed Feb. 17, 1961                                5 Sheets-Sheet 1

FIG. 1

INVENTORS
PALMER C. LUDVIGSEN
CHRISTIAN D. MACY
FRANK M. BROWN
JULIUS A. ZILLGITT
BY Williamson & Palmatier
ATTORNEYS May 12, 1964

C. D. MACY ETAL 3,132,950

PROCESS AND APPARATUS FOR PRODUCING SKINLESS SAUSAGES

Filed Feb. 17, 1961

INVENTORS
PALMER C. LUDVIGSEN
CHRISTIAN D. MACY
FRANK M. BROWN
JULIUS A. ZILLGITT

BY Williamson + Palmatier
ATTORNEYS

May 12, 1964 C. D. MACY ETAL 3,132,950
PROCESS AND APPARATUS FOR PRODUCING SKINLESS SAUSAGES
Filed Feb. 17, 1961 5 Sheets-Sheet 5

INVENTORS
PALMER C. LUDVIGSEN
CHRISTIAN D. MACY
FRANK M. BROWN
JULIUS A. ZILLGITT
BY Williamson & Palmatier
ATTORNEYS United States Patent Office 3,132,950
Patented May 12, 1964

3,132,950
PROCESS AND APPARATUS FOR PRODUCING SKINLESS SAUSAGES
Christian D. Macy, Palmer C. Ludvigsen, Frank M. Brown, and Julius A. Zillgitt, all of Austin, Minn., assignors to Geo. A. Hormel & Co., Austin, Minn., a corporation of Delaware
Filed Feb. 17, 1961, Ser. No. 90,095
15 Claims. (Cl. 99—109)

This invention relates to a high capacity process and apparatus for molding and at least partially cooking protein-containing food mixtures (usually delivered in flowable, comminuted state), to economically produce self-contained food products such as various types of skinless sausages.

Heretofore in the production of sausages, frankfurters and some other protein-containing food products, it has been proposed to temporarily enclose the comminuted meat mixture (usually in emulsified state) in a mold while subjecting the mixture to a cooking temperature, and to thereafter strip the product from the mold. Some of the prior art has provided for a substantially continuous travel and extrusion by pressure of a stream of the emulsified mixture. Heat has been applied to the material and products, variously by high frequency, induction and electrical resistance heating, to coagulate at least part of the protein in the material while partially cooking and molding the same, but such known processes and apparatus are not capable of economical, fast, high production of skinless sausages or comparable protein-containing food products for commercial packing plants and the like.

Furthermore, because of flow or movement of the mixture, during the molding and cooking step and/or due to inability to uniformly heat the mixture in the mold throughout the entire volume thereof, substantial shrinking in volume of the material occurs during the cooking and ejection steps and/or subsequent substantial shrinking occurs during completion of cooking or smoking operations because the product is not properly preformed.

Apparatus and processes of the prior art are for the most part limited to the production of one stream line of operation or to individual sausage molding apparatus.

It is an object of our invention to provide a very high capacity process and apparatus receiving a protein-containing food mixture from a single source under pressure and adapted to simultaneously mold and at least partially cook the material in a multiplicity of tubular molds contained within a shiftable mold unit to very uniformly, efficiently and economically produce a multiplicity of similar rodlike products, such as various types of sausage including Vienna, frankfurters, pork sausage and other protein-containing food materials, molded in self-sustaining form without requirement of skins or casings.

A further object of the invention is the provision of a process and apparatus of the class described wherein the many molded rod formations produced are uniformly molded and partially precooked without significant volumetric loss through shrinkage.

Another object is the provision of a process and apparatus of great commercial capacity which may be utilized for a substantially continuous line of production in a packing plant and which preferably has two or more molding units, each provided with a multiplicity of mold tubes and wherein said units are progressively and alternatively shiftable from a position for simultaneous and uniform filling of the several molds in the unit and at a later step in the process for simultaneous ejection of the preformed products and also, shiftable to a common molding and cooking station where the food material within the many molds is stationary and slightly compressed and in direct contact along its entire periphery and at its ends with smooth mold surfaces.

Another object is the provision of apparatus and process of the type described wherein compression at the ends of the many mold forms is applied just prior to heating and partial cooking of the material, and wherein the heating is uniform throughout the lengths and entire cross sectional area of the material.

Still another object is the provision of apparatus and process of the class described, wherein from each of the multi-unit molds, a multiplicity of elongated, preformed and precooked rodlike products are simultaneously ejected or extruded with closely cooperating steps and mechanism for receiving the extruded rods in parallel and clustered relationship and for immediately thereafter, removing the products from the cycle of operation and the apparatus.

These and other objects and advantages of our invention will more fully appear from the following description made in connection with the accompanying drawings wherein like character references refer to the same or similar parts throughout the several views, and in which.

Figure 1:
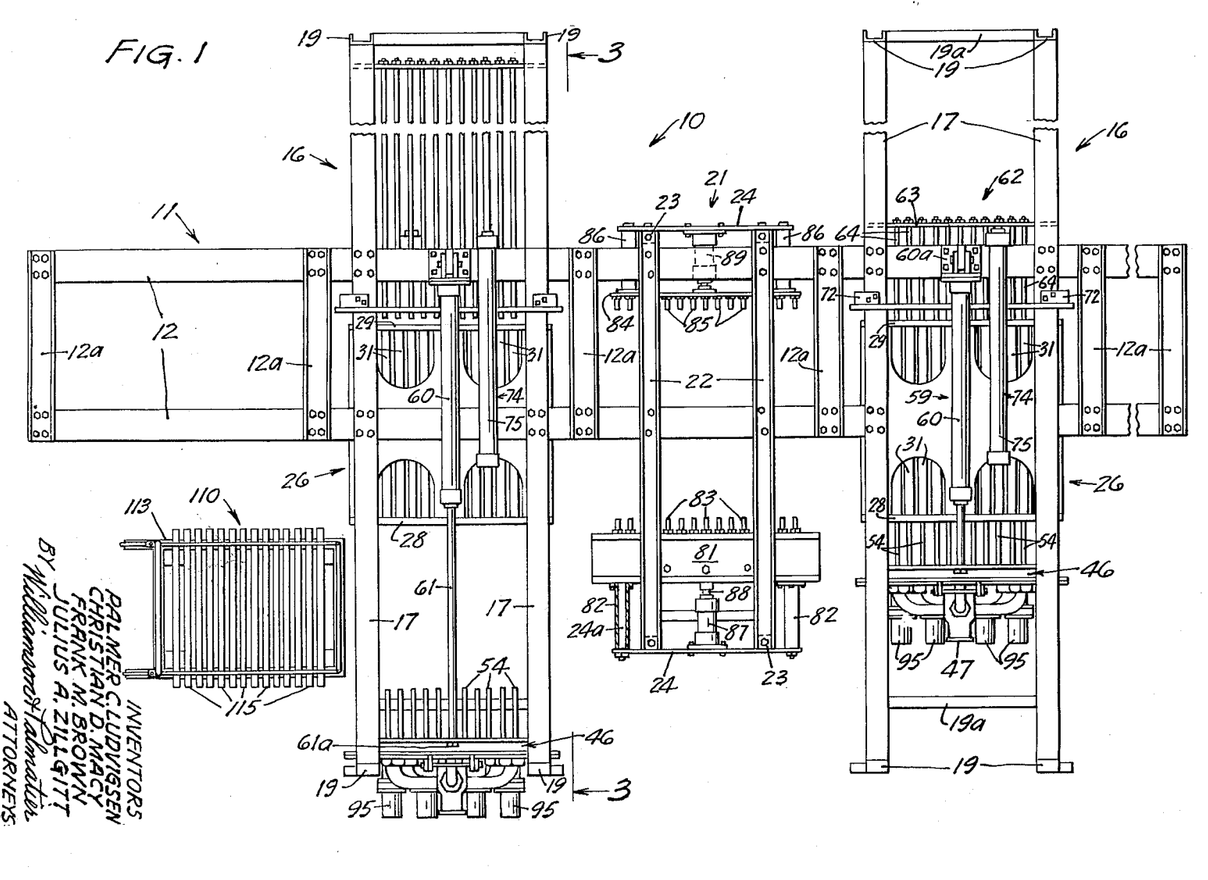
FIG. 1 is a top plan view of the apparatus of our invention with certain portions thereof indicated by dotted line configuration. Certain portions of the apparatus have been foreshortened for clarity.
Figure 2:
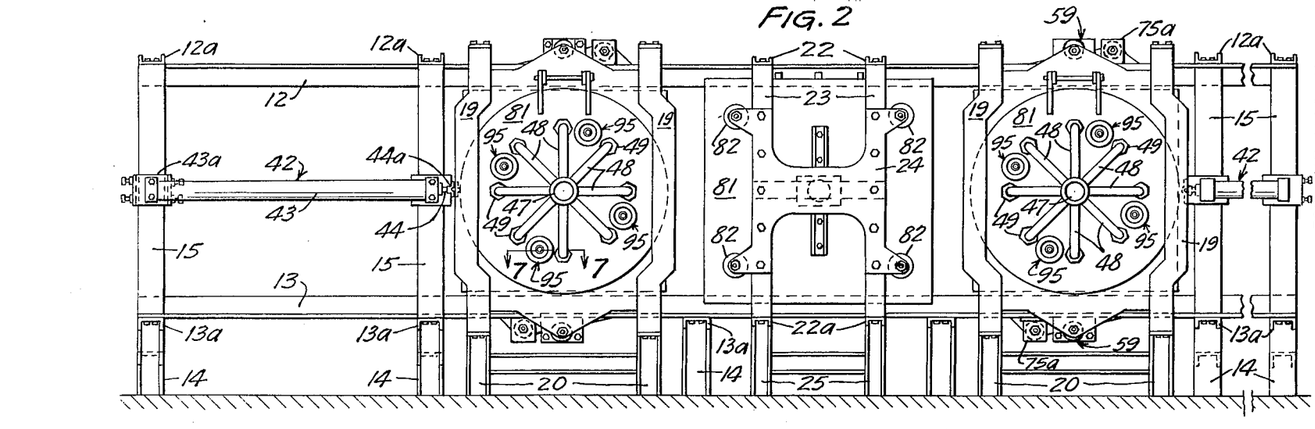
FIG. 2 is a front end elevation of our novel apparatus foreshortened for clarity and with certain portions thereof indicated by dotted line configuration.

Referring to the drawings and particularly to FIGS.

1 and 2, a general overall plan and front elevation of our apparatus is there shown. The main elements of my invention will be treated under separate headings.

Track and Support Structure

The track and support structure is indicated generally by the reference numeral 10 and includes an elongate transversely extending mold unit track and supporting structure 11. It will be noted that the mold unit track structure 11 is comprised of a pair of spaced apart transversely extending upper track members 12 rigidly interconnected by a plurality of longitudinally spaced brace members 12a. The track structure 11 also includes a pair of substantially spaced-apart lower track members 13 vertically spaced from the upper track members 12 and interconnected together by a plurality of transversely extending longitudinally spaced brace members 13a. It will be noted from FIGS. 1 and 3 that the pairs of tracks 12 and 13 are of substantially T-shaped configuration while the braces 12a and 13a, respectively, are of channel-shaped configuration to impart substantial rigidity to the track structure. It will be noted also that the mold unit track structure 11 is supported throughout its length by a plurality of braced legs 14 and that the upper and lower pairs of track 12 and 13 respectively are rigidly interconnected in predetermined spaced apart relation by a plurality of vertically extending braces 15, clearly shown in FIG. 2.

Figure 4:
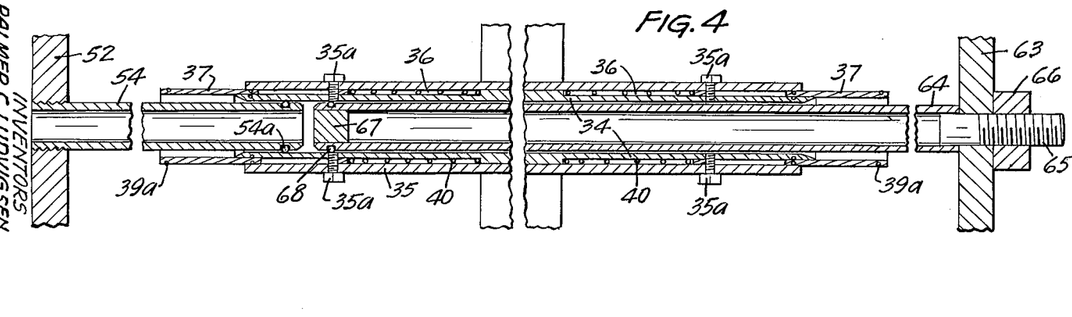
FIG. 4 is an enlarged detailed longitudinal section of one type of the mold members with various other parts of the apparatus shown in cooperating relation to the mold member prior to the injection of the material into the mold element.

The track and support structure 10 also includes a pair of spaced apart substantially parallel track structures 16 which extend in a substantially longitudinal direction and transversely of the mold unit track structure 11. Although more clearly pointed out hereinbelow, it will be seen that these track structures 16 actually define a pair of stations for the mold apparatus. Each of the track structures 16 includes a pair of substantially parallel upper track members 17 each being rigidly affixed to the flange surfaces of the upper track members 12 of the mold unit tracks 11. Each track structure 16 also includes a pair of substantially parallel lower track members 18 fixedly connected to the lower track elements 13 and these upper and lower pairs of track members are rigidly interconnected together by vertically extending end members 19, the latter being rigidly interconnected by means of transverse braces 19a. In order to impart additional support to the longitudinally extending track structures 16, each is provided throughout their respective lengths with leg members 20 as best seen in FIGS. 2 and 4. It will be seen that each of the pairs of track members 17 and 18 of each respective track structure 16 is of substantially T-shaped cross sectional configuration as is the cross sectional configuration of the track members of the mold unit 11.

Figure 3:
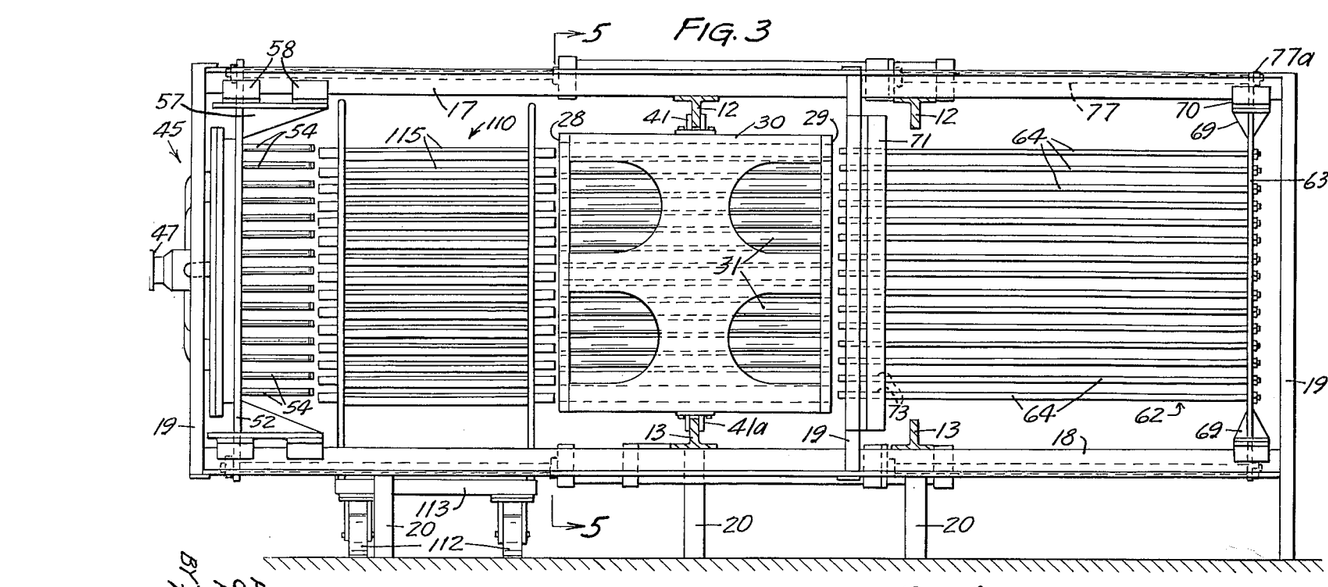
FIG. 3 is a transverse section taken approximately along line 3—3 of FIG. 1 and looking in the direction of the arrows.

The track and support structure 10 further includes an electrical heating mechanism support structure 21 fixedly connected to the mold unit track structure 11 and interposed in substantially parallel relation between the track structure 16. Support structure 21 also defines a treatment station for the mold apparatus as will hereinafter be described and includes a substantially parallel pair of channel members 22 each being rigidly connected as by bolts to the mold unit track member 12, and a pair of substantially lower parallel channel members 22a rigidly connected to the mold unit track members 13. Adjacent upper and lower channel members of the electrical heating support structure 21 are interconnected by vertical braces and these braces 23 rigidly support end bracket plates 24, as best seen in FIGS. 1 and 3. The support structure 21 is also provided with suitable leg frame structures 25, as best seen in FIG. 2 for support thereof. This track and support structure 10 defines a track and support for the various moving parts and mechanisms of our apparatus and these parts and mechanisms will be separately described hereinbelow.

The Mold Structures

Figure 5:
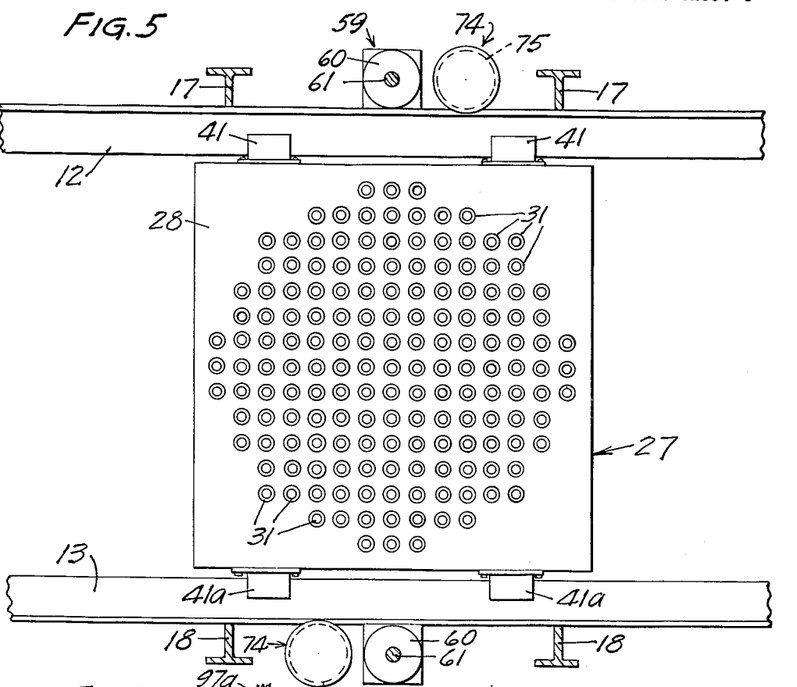
FIG. 5 is a vertical section taken approximately along 5—5 of FIG. 3 and looking in the direction of the arrows.

Referring now to FIGS. 3 to 6, 9 and 11, it will be seen that our novel apparatus also includes the pair of mold units 26 each being of substantially identical construction and each being mounted for reciprocating travel on the mold unit track structure 11. Each of these mold units 26 includes a molding compartment 27 comprised of a front end plate 28 of substantially rectangular configuration as best seen in FIG. 5 and a rear end plate 29 generally corresponding in shape and size to the front end plate 28. These end plates are interconnected by irregularly shaped upper, lower and side walls 30, as best seen in FIG. 3, and each molding compartment is provided with a plurality of elongate tubular mold members 31 arranged in substantially parallel clustered relationship, as best seen in FIG. 5. Actually, the various tubular mold members 31 are arranged in substantially horizontally disposed tiers and define symmetrical geometrical shape.

Figure 11:
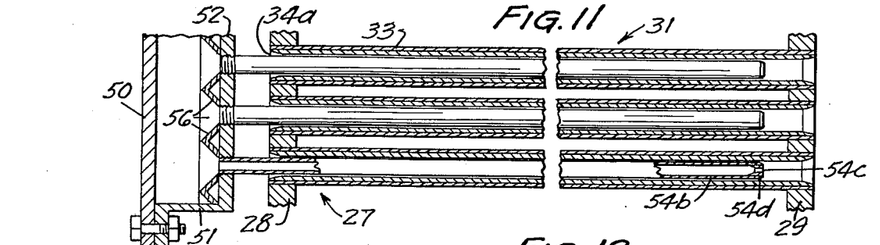
FIG. 11 is a diagrammatic view showing an exemplary probe-type temperature control and indexing system which may be advantageously employed with our process and apparatus.

Referring now to FIG. 11, it will be seen that each of these mold members 31 defines an elongate substantially tubular mold cavity 32 and these mold members are comprised of an outer tubular construction 33 formed of a suitable rigid dielectric plastic material such as melamine and each tubular member also includes a tubular inner liner 34 formed of Teflon and disposed in snug fitting concentric relation with the outer tubular portion 33.

Figure 9:
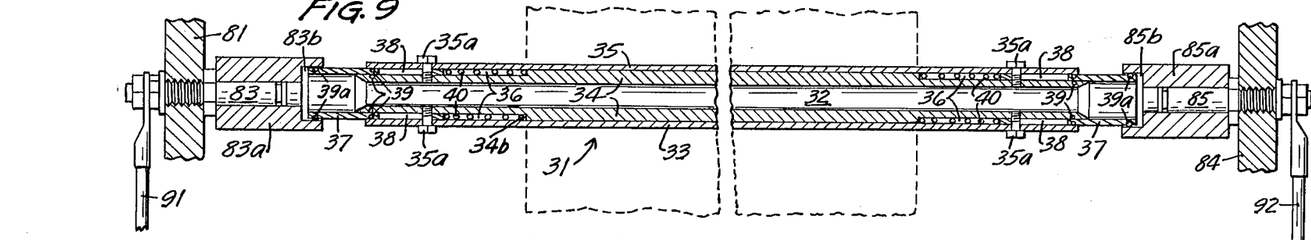
FIG. 9 is a longitudinal fragmentary cross section of the alternative form of mold member, of the type shown in FIG. 4, and illustrated in cooperating relation with the alternative form of heating mechanism associated therewith during the heating operation.

An alternative form of the mold unit is shown in FIGS. 4 and 9 and it will be noted that the outer tubular element 33 of each tubular mold in this form terminates substantially short of the terminal portions of the inner Teflon tube 34 so that the Teflon tube projects axially outwardly from both ends of the outer tubular member 33. In this type mold structure opposite ends of each of the tubular mold members are provided with a fixed sleeve 35 fixedly connected in concentric but radially spaced relation with the Teflon tubular member 34 by means of bolts 35a. Since the inner diameter of the sleeve 35 is substantially greater than the outer diameter of the Teflon sleeve 34, an annular space 36 is defined between the respective sleeves and this space suitably accommodates a slidable sleeve 37 arranged in telescopic relation between the fixed sleeve 35 and the outer terminal portions of the Teflon sleeve 34 at each end of the respective mold members. These slidable sleeves 37 as well as the fixed sleeve 35 are preferably formed of nylon material and the slidable sleeve 37 is provided with a pair of diametrically opposed slots 38 formed therein intermediate its end for receiving the bolts 35a therethrough. Thus, it will be seen that the slidable sleeve 37 at each end of the respective tubular members may be axially shifted in a telescopic manner between the respective fixed sleeves 35 and the outer ends of the Teflon tubular member 34.

Suitable O-ring type seals 39 are provided between the Teflon tube at the slidable sleeve 37 and fixed sleeve 35, while the outer terminal portion of the slidable sleeve is also provided with an O-ring type seal 39a, clearly shown in FIGS. 4 and 9. The outer end portions of the inner sleeve 34 defines an abutment shoulder 33b for a coil spring 40, the outer end of the spring bearing against the inner terminal portion of its associated slidable sleeve 37 so that while the slidable sleeves at opposite ends of the mold members 31 may telescope inwardly when subjected to compression forces, this inward telescoping movement will be against the bias of the coil springs 40 so that the slidable sleeves will normally be urged outwardly. It will also be seen that the inner surfaces at opposite ends of each Teflon tube 34 are beveled, as at 34a, as best seen in FIGS. 4 and 9, the function of which will become more readily apparent.

As pointed out above, the mold units 26 are mounted for reciprocating travel along the mold unit tracks 11 and to this end each of the mold units is provided with a channel-shaped upper track engagement member 41 for engagement with the forwardmost of the upper track units 12 of the mold units 11. Each of the mold units is also provided with a lower channel-shaped track engagement member 41a for engagement with the forwardmost of the lower track members 13 and it will be noted that each of the channel-shaped track engagement members 41 and 41a extend transversely of the respective upper and lower portions of the mold units and are centrally located with respect to the opposite ends of the mold units so that each of the mold units is uniformly supported for sliding movement in a lateral direction along the track support structure 11.

Power means are provided for imparting sliding reciprocating movement to each of the mold units 26 and in the preferred embodiment this power means for each mold unit comprises a hydraulic ram or jack 42 as best seen in FIGS. 1 and 2. It will be noted that each of the hydraulic rams 42 includes a cylinder 43 interconnected as at 43a to one of the vertical braces 15 and also includes a piston rod 44 also suitably connected to its associated mold unit as at 44a. Referring to FIG. 1, it will be seen that the hydraulic rams are so disposed that when the piston rod is retracted its associated mold unit will be disposed in substantial alignment with one of the track structures 16 which, as pointed out above, defines one of the treatment stations of our apparatus and when the piston rod of each hydraulic ram is extended its associated mold unit will be disposed in alignment with the electrical heating support structure 21, the latter defining another station of our apparatus.

*Product Receiving Mechanism*

Figures 7, 8:
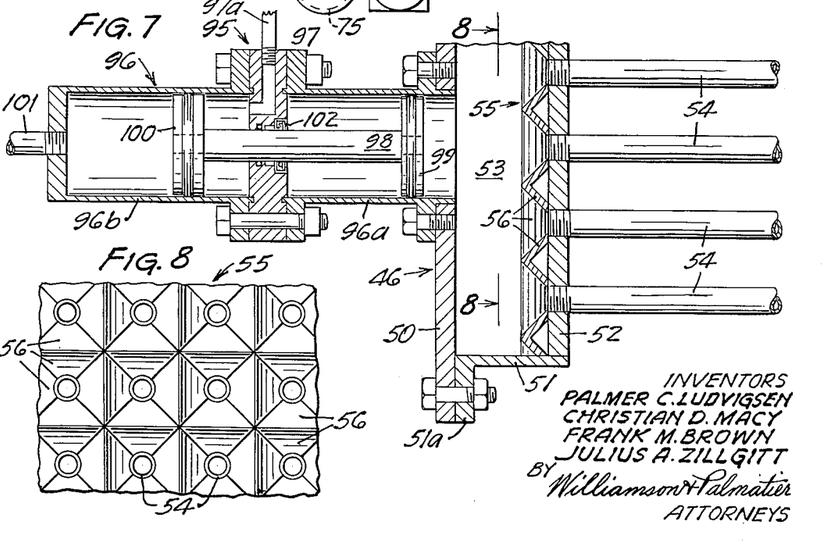
FIG. 7 is a vertical fragmentary cross section view on an enlarged scale of a portion of the product-receiving mechanism taken approximately along line 7—7 of FIG. 2 and looking in the direction of the arrows; illustrating details thereof.
FIG. 8 is a cross sectional view taken approximately along line 8—8 of FIG. 7 and looking in the direction of the arrows.

Referring now to FIGS. 1, 2, 3, 7, 8, and 11, it will be seen that means are provided for supplying material into the two mold units and this means includes a pair of product receiving mechanisms designated in their entirety by the reference numeral 45, each being shiftably mounted on one of the track structures 16. Each of these product receiving mechanisms includes a plenum chamber structure 46 which, as best seen in FIGS. 2 and 7, is of substantially shallow cylindrical shape. These plenum chambers are each connected to a supply of comminuted material under pressure such as comminuted meat used in the productions of sausages, weiners and the like, the meat being conveyed to the plenum chamber through a main inlet conduit 47 into the plurality of inlet manifold lines 48 communicating with the chamber and the main inlet conduit. It will be seen that the manifold lines 48 extend radially outwardly from the main inlet conduit and are interconnected to the plenum chamber structure by means of conventional fittings 49. Each of the main inlet conduits 47 which will be connected to a supply of material under pressure such as a pump, is disposed in substantially coaxial relation with respect to its associated plenum chamber 46 and it will be noted that the inlet manifold lines 48 extend in a symmetrical fashion from the main inlet conduit so that the plenum chamber is uniformly supplied with the comminuted material.

The plenum chamber structure 46 is comprised of a substantially circular front plate which, as best seen in FIG. 7, is rigidly interconnected to the annular flange 51a of a cylindrical wall 51. Each plenum chamber structure also includes a rear plate 52 which is substantially larger than the front plate and cylindrical wall 50 and 51, respectively, and cooperates with the front plate and wall 50 to define a susbtantially cylindrical plenum chamber 53.

The plenum chamber structure 46 is provided with a plurality of threaded openings for threadedly receiving the threaded ends of a plurality of injection nozzles 54, the latter cooperating with one of the mold units for injecting material into the latter. In this connection each of the injection nozzles 54 is provided with a conventional sealing ring 54a to permit a substantial seal during the injection operation. Referring again to FIG. 7, it will be seen that the rear plate 52 is provided with a faceted wall 55 comprised of a plurality of facets 56 arranged in opposed pairs so that each group of four facets are disposed in converging relation with the front open end of each of the injection nozzles 54. With this arrangement, the material will be positively directed to a funneling manner into the respective injection nozzles so that a uniform injection of material into the various mold members of each mold unit may be accomplished. In this connection, it should be pointed out that the injection nozzles are, of course, arranged in symmetrical tiered fashion corresponding to the arrangement of their respective associated mold units. In the embodiments shown, each mold unit includes 161 mold members and it will be seen that the inlet ends of the manifold conduits 48 are symmetrically arranged with respect to the plenum chamber structure 46 so that each of the manifold lines uniformly supplies 20 of the injection nozzles with the comminuted material. The relatively shallow construction of the plenum chamber plus the unique arrangement of the manifold supply line and the faceted wall structure permit uniform injection of the material from the plenum chamber into the various mold units thus assuring simultaneous filling of each of the mold units during the filling operations.

It will also be noted that each of the product receiving mechanisms 45 is mounted for shifting reciprocating movement between an out-of-the-way inoperative position and an operative position and means for mounting the respective product-receiving mechanisms on their associated supporting track structures 16 includes a plurality of mounting brackets 57 rigidly connected to the respective corner portions of the rear plate 52 of each product receiving mechanism. Each of these mounting brackets 57 is provided with a pair of channel-shaped guides 58, the uppermost pairs of guides engaging the upper pairs of tracks 17 and the lower pairs of guide units engaging the lower track 18 of their respective track and support structures 16. Power means are also provided for shifting each of the respective product receiving mechanisms between operative and inoperative positions and this power means includes a pair of hydraulic rams 59 for each product receiving mechanism 45. Referring now to FIG. 2, it will be seen that the hydraulic rams for each product receiving mechanism 45 are arranged in upper and lower relationship for imparting longitudinal force uniformly to the respective product receiving mechanism. In this connection it will be noted that the rams for each unit include a cylinder 60 interconnected at their respective rearmost end portions by brackets 60a to the mold unit support and track structure 11. The uppermost of these rams is interconnected to the rearmost of the upper tracks 12 while the lowermost of the rams is rigidly interconnected to the rearmost of the lower tracks 13. The front ends of the piston rods 61 of the rams 59 are connected to the base plates 52 of their associated product receiving mechanisms 45 as at 61a. Actuation of the rams causes longitudinal shifting of the product receiving mechanisms towards and away from their respective mold units.

Figure 12:
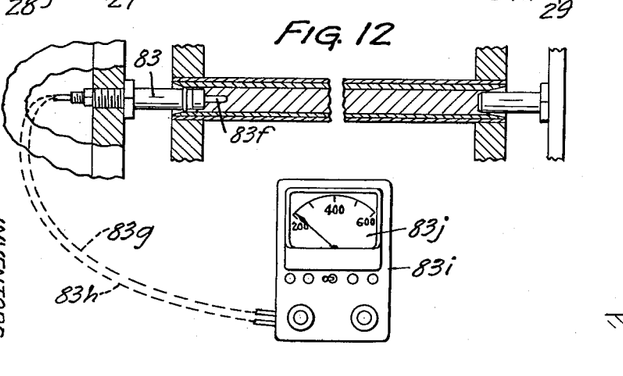
FIG. 12 is a diagrammatic view illustrating a somewhat simplified apparatus and process wherein dual functions of the injector tubes for subsequent extrusion of the product is utilized.

An alternative construction of the product receiving mechanism is diagrammatically illustrated in FIG. 11 of the drawing and this product receiving mechanism is identical to that previously described except for the construction of the injection nozzle designated in FIG. 12 by the reference numeral 54b. It will be seen that the injection nozzles 54b are of a length to extend completely through their associated mold cavities 31 and in this form will be substantially longer than the previously described form as best illustrated in FIGS. 4 and 7. It will be noted that the injection nozzles 54b have a reduced discharge aperture 54c which present a relatively wide annular terminal discharge face 54d. With this arrangement, the product receiving mechanism, illustrated in FIGURE 12 performs a dual function of injecting the material into its associated mold unit and also serves to cause subsequent extrusion of the rodlike products formed in a manner to be described hereinbefow.

Ejection Mechanism

Means are also provided which cooperate with the injection nozzles to insure uniform filling of the mold units and which also serve to eject the rodlike formations of material after the material within the mold units has been heated so that the protein content is coagulated. This means includes a pair of ejection mechanisms, as best seen in FIG. 1, FIG. 3 and FIG. 4, each being mounted for shifting reciprocating movement on one of the track structures 16 and each being arranged during normal operation for synchronized movement with one of the product receiving mechanisms 45.

Each of these ejection mechanisms includes a substantially rectangular mounting plate 63 having a plurality of symmetrically arranged apertures formed therein through which extend the rear end portions of a plurality of tubular ejector elements 64. It will be noted that the tubular ejector elements 64 are of elongate hollow construction and are provided with threaded rear ends 65 which extend through the apertured mounting plates 63 and are secured in place by means of a lock nut 66 which threadedly engages these rear ends. The front end portion of the hollow tubular elements 64 is provided with a lug 67 having an O-ring type seal 68 disposed therein. Mounting plate 63 is provided with mounting brackets adjacent its corner portions and these mounting brackets 69 are each provided with a channel-shaped guide 70 to permit mounting of the plate 63 upon the upper and lower pairs of track members 17 and 18 respectively of the track structure 16.

Thus, it will be seen that the mounting plate 63 and its associated tubular ejector elements 64 are mounted on its associated track structures 16 for sliding reciprocating movement relative thereto so that the ejector elements of one of the ejector mechanisms 62 may be extended into the tubular mold cavities of one of the mold units 26. Since the elongate tubular ejector elements 64 project outwardly beyond the mounting plate 63, a guide plate 71 is provided to insure alignment of each of the tubular elements 64 with its associated mold cavities into which it is extensibly and retractably movable. The guide plate 71 which is of substantially rectangular configuration is provided with mounting brackets 72 located adjacent the corner portions of the plate and which are rigidly secured to the track members 17 and 18 respectively.

It will be noted that guide plate 71 is provided with a plurality of apertures 73 through which extend a tubular ejector element 64 and during extensible movement of the mounting plate 63 or towards the mold unit 26 the elongate tubular ejector elements 64 are maintained in their aligned relation with respect to the mold cavities. In this connection it will be noted that the ejector elements 64 are of a length so that when the ejector elements are moved to an extended position towards the mold units the ejector elements will extend completely through their associated mold cavity thus causing the rod formation of material disposed in the cavities to be ejected longitudinally therefrom.

Means are provided for causing extensible and retractable movement of the ejector mechanism 62 and this means includes a pair of double acting hydraulic rams for each ejector mechanism. Each of these hydraulic rams designated generally by the reference numeral 74 includes a cylinder 75 secured by brackets 75a to the mold unit track structure 11. Each of the rams also includes a piston rod 77 having its outermost end connected, as at 77a, to the mounting plate 63 of its associated ejection mechanism. Thus, it will be seen that the ejection mechanism 62 may be readily extended and retracted into and out of its associated mold unit 26.

It is pointed out that inasmuch as the product receiving mechanism illustrated in FIG. 11 forms a dual function of filling the mold unit as well as causing longitudinal extrusion of the rod formations of material, there is no ejection mechanism associated therewith.

Electrical Heating Mechanism

Means are also provided for electrically and uniformly heating the comminuted material filling the respective mold members of each mold unit so that the protein constituent of the material will be coagulated. Coagulation or partial coagulation of the protein constituent of the material causes permanent setting of the comminuted material into rod like formations so that it will retain its shape when removed from the mold. Although heat may be applied to the material in various ways during the partial cooking or coagulation of the protein material within the mixture, it is preferred that electrical resistance type heating be utilized so that uniform heating of this comminuted material may be achieved.

In resistance type heating the material itself represents an electrical resistance element when a current is passed through the material so that the heat generated as a result of this resistance is sufficient to cause uniform coagulation of the protein within the material.

Figure 6:
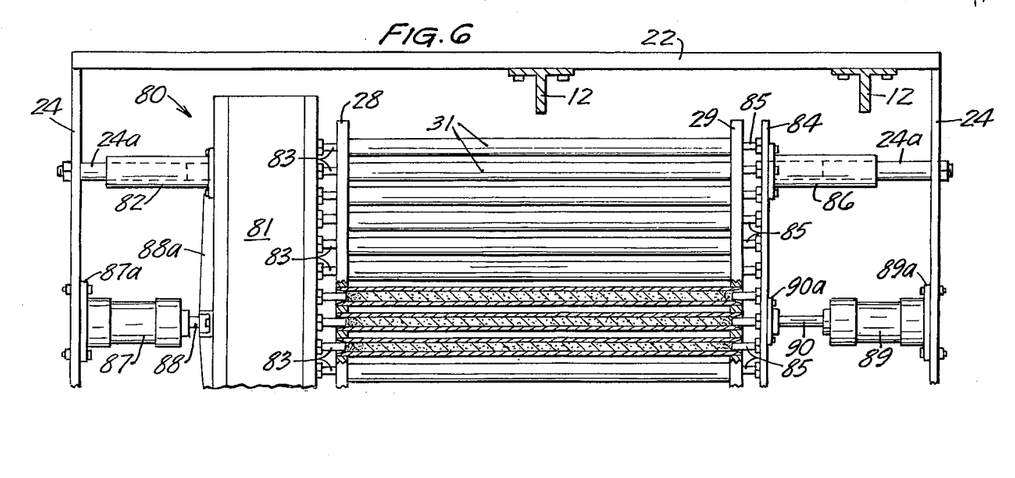
FIG. 6 is a side view partly in elevation and partly in section illustrating one of the mold units at the material heating station with the electrical heating mechanism being disposed in cooperating relation with the mold unit.

The heating mechanism is designated generally by the reference numeral 80 and includes a junction box or receptacle 81, clearly shown in FIGS. 6 and 9. This junction box 81 is mounted for reciprocating movement on the supporting structure 21 and is provided with a plurality of sleeves 82 fixedly connected therewith and extending forwardly therefrom as best seen in FIG. 6. These sleeves 82 telescopically receive a plurality of inwardly projecting guide rods 24a fixedly connected to the front mounting brackets 24 of the supporting structure 21. The junction box 81 is provided with a plurality of positive electrodes 83 through which the incoming current is received, each of the electrodes 83 being disposed in engagement with the end portions of the material within one of the mold members 31. The heating mechanism 80 also includes a mounting plate 84 shown at the right side of FIG. 6 and which has a plurality of ground electrodes 85 fixedly carried thereby. This mounting plate 84 is also provided with a plurality of mounting sleeves 86 slidably mounted on a plurality of guide rods 24a identical in construction to the guide rods associated with the junction box 81. The mounting plate 83 is suitably formed of a non-conductive material so that the various electrodes are insulated from each other. These electrodes 85 are adapted to engage the material within the rearmost end portions of each of the mold members and cooperate with the electrodes 83 to compress the material within the tubes. An electrical current is passed through the electrodes 83, the resistance offered to the current by the comminuted material itself actually creates the necessary heat to coagulate the protein uniformly throughout the volume of material.

Means are provided for moving the junction box 81 from a retracted position to an extended position wherein the electrodes engage the material within the ends of the tube and this means includes a hydraulic ram 87 connected to the forwardmost mounting bracket 24 by means of a bracket plate 87a. Ram 87 is provided with a conventional piston rod 88 having its outermost end connected to the junction box 81 by means of a bracket 88a. Extension and retraction of the piston rod 88 causes corresponding shifting movement of the junction box 81 so that the electrodes carried by the junction box may be moved into engagement with the comminuted material filling the respective mold members.

Power means are also provided for shifting the ground electrode mounting plate 84 and this power means includes a ram 89 rigidly connected by a bracket plate 89a to the rearmost of the mounting bracket 24 and ram 89 is provided with extensible and retractable piston 90 connected by a bracket plate 90a to the mounting plate 84. Extension and retraction of the piston rod 90 causes corresponding extension and retraction of the mounting plate 84 so that the ground electrodes 85 may be moved into and out of engagement with the material filling the mold members.

Referring to FIGS. 6 and 12, it will be seen that both the positive electrodes 83 and the ground electrodes 85 have been illustrated as being of substantially rodlike formation for penetration or telescopic reception into their associated mold members.

An alternative form of the heating mechanism 80 is shown in FIG. 9 and this form is especially adapted for use with alternative form of mold unit illustrated in FIGS. 4 and 9. In this form it will be noted that positive electrodes 83 are provided with a cup shaped element 83a rigidly mounted thereon. Each of these cup shaped elements 83a is formed of non-conductive material such as nylon or the like and each is provided with a cylindrical recess 83b for receiving the outer terminal end of slidable sleeve 37 therein. Each of the negative electrodes 85 has a cup shaped element 85a rigidly mounted thereon, the cup shaped elements 85a being of substantially identical construction as that of cup shaped elements 83a. It will, therefore, be noted that the cup shaped elements 85a associated with the negative electrodes are provided with a cylindrical recess 85b for receiving the terminal portions of the slidable sleeve 37 associated with the rear end of the mold members. It will be noted that when the junction box 81 and the mounting plate 84 are extended, the positive and negative electrodes will impart an inward compression on their respective mold members to cause the slidable sleeves located at each end of the mold members to telescope inwardly against the bias of the coil springs 40 so that the material within the molds will be slightly compressed. This close confinement of material within each of the mold members permits partial cooking without the shrinkage of the material normally attendant in such a cooking operation. The circuitry for the electrical heating mechanism has not been illustrated but it is pointed out that the junction box will be connected to a suitable source of electrical current and that each of the positive electrodes 83 will be provided with a lead wire 91 through which the current passes while each of the electrodes 85 will be suitably connected to a ground wire 92.

*Operation*

It will be seen from FIGS. 1 and 2 that the mold units 26 are mounted on track structure 11 for reciprocating longitudinal movement between the first stations defined generally by the support structures 16 and the common centrally located station defined generally by the electrically heating mechanism support structure 21. During the operation of the apparatus, each mold unit 26 will be alternately moved so that when one of the mold units 26 is at its first treatment station defined by the support structure 16 the other mold units will be at the second station defined by the support structure 21. The hydraulic rams 42 which supply the motive force for moving the respective mold units 26 will be arranged for synchronized operation so that the alternate shifting of the mold units may be accomplished. Control circuits and flow diagrams for accomplishing this particular operation are thought to be unnecessary in the instant application since the particular construction of such control mechanism constitutes no part of the instant invention.

During one cycle of operation of the apparatus, the mold unit 26 located at the right side of FIGS. 1 and 2 will be disposed in a position to be filled with the emulsified comminuted material such as that used in the production of various types of sausage including Vienna, frankfurters, pork sausage and other protein-containing food materials. When in the material-filling treatment station, the product receiving mechanism 45 will be shifted towards the front end of the mold unit 26 by actuation of the hydraulic cylinder 60. The ejection nozzles 54 will each be inserted into the open front ends of the mold members of their associated mold unit as clearly illustrated in FIG. 4. In order to insure uniform filling of each of the mold members so that there will be no occurrence of voids in the material, the ejection mechanism 62 will be extended so that each of the ejector mechanisms 64 has its forwardmost end disposed in contact with one of the injector nozzles. When material is injected into the molds, the ejection mechanism will be simultaneously withdrawn so that each of the ejector elements impart a suction-like piston action during this filling operation. When the filling of the mold unit is complete, the ejection mechanism 62 will be completely retracted so that the product receiving mechanism will thereafter be retracted and the mold unit will be in condition for movement to the product heating station, the shifting of the mold unit being accomplished by actuation of the hydraulic rams 42.

Since the emulsified material is forced into the plenum chamber 53 under pressure by the action of the pump, means may be provided for preventing material from being forced out of the ends of the ejector nozzle at the end of the filling operation. Some of the material under pressure in the plenum chamber may flow out unless this pressure is released and to this end pressure release means are provided for each of the product receiving mechanisms 45. Referring now to FIGS. 2 and 7 it will be seen that a pressure release mechanism 95 is provided for each plenum chamber to relieve pressure uniformly throughout the plenum chamber upon the cessation of operation of the pump which supplied the material to the product receiving mechanism. The pressure release mechanism includes a plurality of cylinders 96 fixedly connected to the front plate 50 of the plenum chamber structure 46 with the interior of each of the cylinders 96 communicating with the plenum chamber 53. It will be noted from FIG. 7 that each cylinder 96 is comprised of a pair of cylindrical members 96a and 96b rigidly connected in fluid sealing relation to a central partition 97. The innermost cylindrical member 96a is fixedly connected to a front plate 50 of the plenum chamber 46 and the centrally located partition 97 is provided with an aperture for slidably receiving the piston rod 98. Piston rod 98 is provided with an inner piston head 99 and an outer piston head 100 each being disposed on opposite sides of the partition 97. A pneumatic line 101 is connected in fluid conducting relation with the cylindrical member 96b and the piston rod 98 is provided with a fluid seal 102 to prevent the passage of air from one side of the partition 97 to the other.

During the the operation of the pump which supplies the emulsified comminuted material through the main inlet conduit 47 of the product receiving mechanism 45, air under pressure will also be supplied to the left side of the cylinder 96 so that the piston head 99 will be disposed in substantial coplanar relation with the inner surface of the front plate 50. When the operation of the pump is stopped, a solenoid control valve (not shown) will be actuated so that air pressure to the left side of the outer piston head will be released. When the air pressure forcing the piston rod to the right in coplanar relation with respect to the inner surface of the plenum plate 50 is relieved, air under pressure will be supplied to the space at the right side of piston head 99 to simultaneously cause movement of the piston to the right as viewed in FIG. 7. Air is supplied to this side of the piston 99 through a conduit 97a. The material within the plenum chamber 53 will flow into the cylindrical member 96a thus relieving the pressure exerted by the material in the plenum chamber. Since each of the plenum chambers are provided with a plurality of such cylinders, simultaneous actuation of several mechanisms will be sufficient to relieve the pressure within the plenum chamber thus preventing the escape of material through the ejection nozzles.

When the mold unit at the left, as viewed in FIG. 1, is shifted to the second treatment station as defined by the support construction 21, the positive electrodes 83 and negative electrodes 85 will be disposed in alignment with the ends of the respective mold cavities of the mold unit. Actuation of the hydraulic rams 87 and 89 causes simultaneous extensible movement of the junction box 81 and the mounting plate 84.

The electrodes 83 and 85 will be telescopically within the opposite ends of the mold members 31 as the electrodes are moved axially inwardly, the comminuted material within the tubular mold members 31 will be inwardly compressed. While the comminuted material is retained in this compressed immobile state, an electrical switch (not shown) is closed so that electrical energy is supplied to the junction box 81 and thereafter through the respective positive electrodes 83. Inasmuch as each of the mold members 31 is constructed of dielectric material, the electrical current will be caused to pass through the comminuted material which, as pointed out above, actually constitutes an electrical resistance element in the electrical circuit. The resistance offered by the material generates heat sufficiently enough, as is well known in the art, to cause uniform coagulation of the protein within the mold members. The exact length of time required to coagulate the protein will depend upon several factors, as for example, the temperature of the product and the time the current flow is started, and the power applied by the source of electrical energy to the product. As pointed out above, alternating or direct current may be used.

If the particular mold unit is of the alternative construction as illustrated in FIGS. 4 and 9, the cup shaped members of each positive electrode will engage the slidable sleeve 37 located at the front end of each of the mold members 31 while the cup shaped member 85 will engage the slidable sleeve located at the rear end of each of the mold members 31. It will be noted that as the slidable sleeves 37 at each end of each mold unit 31 are moved axially inwardly, the comminuted material within the mold members 31 will be inwardly compressed and the material will be maintained in this compressed immobile state during the heating operation. In this form electrical current will be supplied to the junction box 81 and the material within the mold units will be partially cooked by means of electrical resistance heating.

The specific electrical circuitry for the heating mechanism 88 is not shown but, as pointed out above, the material within each mold which actually constitutes an electrical resistance element in the closed circuit. In order to obtain the best possible results, circuit control means are provided for controlling the electrical circuit to the electrical heating mechanism 80.

Referring now to FIG. 11, it will be seen that an exemplary probe type temperature control indexing system is illustrated therein for automatically controlling the circuits and thereby control the heating of the material. The type of control system illustrated is that generally known in the trade as Electronic Temperature Indicating Control Thermistor Sensing, Series 560. When a controller is employed, electrodes 83 and 85 will be arranged in banks or series so that current will be simultaneously supplied to a plurality of these pairs of electrodes and for purposes of description it is pointed out that the pairs of electrodes may be arranged in banks or series of twenty.

Since there are approximately 160 such pairs of electrodes, then there will be approximately twenty banks or series. The circuitry for such heating mechanism will include eight such circuits and the circuit control means for controlling this circuit and time of the heating cycle, as illustrated diagrammatically in FIG. 11, may include a Fenwal Series 560 indicating controller with thermistor sensing.

This probe type mechanism includes a relatively small sensing probe 83f, which is a semi-conductor with the unique property of giving great and rapid resistance change with a very small change in temperature. This sensitivity also makes it possible to use a simple null balance bridge circuit for controlling the current to the particular bank or series of electrodes associated therewith. The sensing probe 83f will be connected in an electrical circuit by means of electrical conductors 83g and 83h to combination indicator and control instrument 83i. The instrument allows the particular temperature for controlling the circuit to be determined and to this end a dial indicator 83j is provided. The indicator and controller instrument 83i may be adjusted so the particular temperature at which time the switch mechanism controlling the current will be actuated to be selectively controlled. A combination indicator and controller instrument 83i will be preferably remotely positioned with respect to the heating mechanism and it will be seen that a plurality of such instruments may be provided for each particular bank or series of electrodes. It is also pointed out that one indicator control instrument may be provided for a plurality of such probes so that a single operator may readily determine what particular temperature is desirable to have the current to the electrodes shut off. Opening of the circuit to the electrodes may be accomplished by circuitry associated with the instrument itself and particular detailed showing of this is unnecessary since the functioning of the instrument is well known in the trade.

Coagulation of the protein in the emulsified comminuted material causes permanent setting of the material so it will retain its shape after it is removed from the molds. It has been found that by closely containing the material within the mold units during the application of heat, assures partial precooking of the product without significant volumetric loss through shrinkage.

While the mold unit 26 located at the right side of FIGS. 1 and 2 is disposed at the treatment station for application of heat and during the application of electrical resistance heating, the mold unit 26 located at the left side of FIGS. 1 and 2 will be filled by the cooperative relation of the product receiving mechanism 45 and the ejection mechanism 62 associated with that mold unit. Thereafter, when the mold unit 26 previously located at the material heating station is returned to the first station by the retraction of the piston rods of ram 42 associated therewith, the mold unit at the left will be shifted to the material heating station.

The left mold unit 26 is, therefore, in position to have the application of heat while the right mold unit is in position to have the rod formations of material ejected longitudinally therefrom by the ejector mechanism 62. In this connection, both the product receiving mechanism 45 and the ejection mechanism 62 associated with the right mold unit 26 will be in their respective retractive positions. The rams 74 will be actuated so that their respective piston rods 77 will be retracted to cause retraction of the right ejector mechanism 62 into the right mold unit 26. Telescoping movement of the tubular ejector element 64 into the mold cavities 32 of the right mold unit 26 causes the rod formations of material therein to be ejected longitudinally from the mold unit.

Figure 10:
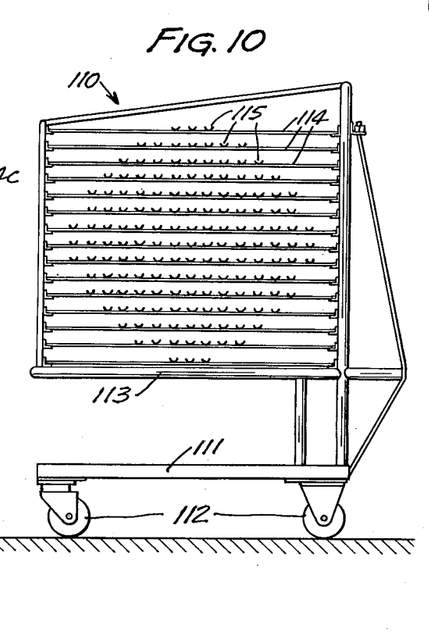
FIG. 10 is an end elevational view of a mobile tray mechanism.

To facilitate handling of the rod formations of the material a mobile tray mechanism 110 is provided to simultaneously receive the rod formations of partially cooked material as they are ejected. This tray apparatus 110 is provided with a mobile chassis 111 having suitable wheels 112 and having a cantilever support frame 113. The cantilever support frame 113 is provided with a plurality of tiered tray supports 114 each supporting a plurality of elongate tray elements 115 each of which is of channel shaped cross sectional configuration as best seen in FIG. 10. The tray elements 115 are arranged in a symmetrical pattern corresponding to the geometrical pattern of the mold members 31 of the right mold unit 26. The mobile tray mechanisms 110 may be manually moved as illustrated in the accompanying drawings or may be track mounted for cyclic reciprocating movement.

If the form of product receiving mechanism 45, illustrated in FIG. 12, is utilized there will be no ejection mechanism as pointed out above. It will be seen that when the respective mold units are alternately moved to their respective first stations for extrusion longitudinally of the product formations of material, the elongate tubular injection nozzles 54b will be telescopically moved into the mold members of its associated mold unit to cause simultaneous extrusion of a rodlike formation. The tray mechanism 110 will be disposed adjacent the end of the molds wherein the ejection mechanism of the other type product receiving mechanism is utilized. It will be noted that the terminal annular surfaces 54d present sufficient surface area to cause the extrusion of the product formations of material when these ejection nozzles 54b are extended into the mold units. With the end of the stroke and just prior to the completion of the ejection of the rodlike formations from the mold units, the product receiving mechanism 45 will be retracted and will simultaneously eject comminuted material into the mold for the filling cycle, so that the product receiving mechanism serves the dual purpose of both longitudinal extrusion of the rod formations of material and also of filling the respective mold units.

During the ejection operation of the right mold unit, the left mold unit and the emulsified comminuted material therein will be subjected to the initial part of the compression and heating operation. It should be pointed out that during the heating operation the temperature of the comminuted product will range between 135° F. to 170° F. internal temperature. The most desirable temperature during the heating operation is between 150° F. and 165° F.

Thereafter the left mold unit will be subjected to the heating operation and simultaneously with the occurrence of the completion of the heating operation for the left mold unit 26 the product receiving mechanism 45 for the right mold unit will be extended to a position for injecting material into the right mold unit, the ejector mechanism 64 being disposed in telescopic relation within the right mold unit for cooperating relation with the product receiving mechanism. The right mold unit will therefore be filled and will be in condition for lateral shifting movement to the material heating station when the left mold unit is returned to its original station for the ejection operation. It should be pointed out that the Teflon inner tubular member 34 facilitates the removal of the rodlike formations and also precludes the tendency of the material to adhere to the surface when the mold unit is filled. The Teflon material is also an electrical non-conductor so it is preferred over other dielectric plastic materials. The left mold unit which has its respective product receiving mechanism 45 and ejection mechanism 62 in the retracted positions and the ejection mechanism will thereafter be extended to cause longitudinal ejection of the material from the mold unit. The left mold unit will be provided with a mobile tray mechanism of substantially identical construction to the tray mechanism 110 associated with the right mold unit.

It will be noted that the cantilever support frame of the tray mechanism permits the tray mechanism to be moved into position for receiving material ejected from the mold unit. The space defined between the mobile chassis and cantilever support frame of each tray mechanism accommodates the lower track members of the track and support structure 16.

It will be seen that we have provided a novel and unique apparatus to permit the carrying out of our novel process of simultaneously molding and at least partially cooking a multiplicity of rodlike food products in a one cycle of operation. In our novel process, the comminuted material containing protein which may be the types used to produce various kinds of sausages including Vienna, frankfurters, pork sausages and other protein-containing food material, is simultaneously injected into a multiplicity of mold cavities of a multi-tubular mold unit to substantially fill the same. In conventional practices, as pointed out above, the protein-containing food products, usually in an emulsified state, were enclosed within a mold while subjecting the mixture to a cooking temperature. The mold was thereafter stripped from the cooked product. Other practices in the prior art will provide for substantial continuous travel and extrusion by pressure of steam of the emulsified mixture and the comminuted product was heated electrically by high frequency, induction and electrical resistance heating to coagulate at least part of the protein into the material. During such process, however, the material was flowing or moving during the heat treatment thereof and there was a very substantial shrinking throughout the entire volume of the product during this heating operation. These prior art practices were also undesirable in that these practices were not even adaptable to high capacity operations and the resulting products were not of uniform quality due to the shrinkage of the products.

In our high capacity continuous process, after the mold units are filled with the comminuted material, the material is thereafter uniformly heated preferably through the medium of electrical resistance heating so that the protein in various mold units is at least partially coagulated thus causing permanent setting of the material in rod formations.

During the heating step of our operation, it has been found that if the material is compressed slightly prior to the energization of the various circuits in this electrical type resistance heating, and if the material is maintained in an immobile state during the heating step, there will be an almost negligible amount of volumetric shrinkage. It has also been found that the final product will shrink very little during any subsequent cooking even though the external surface of the product is broken.

Our novel process also includes the step of simultaneous longitudinal extrusion of all of the formed rod products from the mold units and preferably having these products received by a product receiving tray mechanism. By alternately arranging the mold units of our apparatus, we provide a continuous process so that the sequential steps constituting the cycles of operation for each mold unit may be arranged in alternating fashion so that a very high efficient capacity operation may be achieved.

It will, therefore, be seen from the foregoing paragraphs that we have provided a process and apparatus for carrying out the process for high capacity production of a multiplicity of similar rodlike products such as various types of sausage including Vienna, frankfurters, pork sausage and other protein including material.

It will be noted that our unique and novel process and apparatus permits the partial precooking of food products in a manner wherein there is uniform coagulation of the protein contained in the material without the significant volumetric loss through shrinkage normally attendant during this precooking operation in heretofore known prior art devices.

It will also be seen from the preceding description that our unique apparatus permits continuous production of a plurality of semi-cooked food products because of the arrangement and construction and operation of the molding units.

Thus, it will be seen through the use of progressively and alternatively shiftable mold units, the precooked food products may be produced in greater quantities and in a more efficient manner than any heretofore known comparable devices.

It will, of course, be understood that various changes may be made in the form, details, arrangement and proportions of the various parts without departing from the scope of our invention.

What is claimed is:

1. The process for simultaneously and at least partially cooking a multiplicity of elongate rod-shaped food products in one cycle of operation from comminuted material containing protein, which process includes the steps of injecting said material substantially simultaneously into a multiplicity of mold cavities of a multi-tubular mold unit to substantially fill the same, uniformly heating the material filling all of said mold cavities, while maintaining the same immobile, by means of electrical resistance heating wherein the material within each cavity constitutes an electrical resistance element in an electrical circuit, the material within the molds being heated for a period of time and at a temperature to at least partially coagulate said protein in their respective molds to thereby produce permanent setting of the material in rod formations, and thereafter simultaneously ejecting the molded rod formations longitudinally from all of said mold cavities.

2. A process of forming and at least partially cooking, in one cycle of operation, the multiplicity of elongate rod-shaped sausage products from a source of comminuted and flowable material containing protein, which process includes the steps of, injecting said material substantially simultaneously and uniformly into the several mold cavities of a multi-tubular mold unit to substantially fill the same, shifting said filled mold unit into a different position for material heating, closely containing the material within said several mold cavities of said multi-tubular unit and simulatneously and substantially uniformly heating the material throughout by means of electrical resistance heating wherein the material within each cavity constitutes an electrical resistance element in an electrical circuit, the material within the molds being heated for a period of time and at a temperature to coagulate protein therein and produce permanent setting of such materials in a multiplicity of rod-shaped formations, shifting said mold unit to an ejection station and simultaneously and longitudinally removing said rod formations from said multiplicity of tubular molds.

3. A process of forming and at least partially cooking, in one cycle of operation, a multiplicity of elongate rod-shaped sausage products from a source of comminuted and flowable food material containing protein, which process includes the steps of, injecting said material substantially simultaneously and uniformly into the several mold cavities of a multi-tubular mold unit to substantially fill the same, shifting said filled mold unit to a different position for material heating, applying inward pressure at the ends of the tubular mold cavities from compressing the material therewithin and simultaneously electrically and substantially uniformly heating the material throughout by means of electrical resistance heating wherein the material within each cavity constitutes an electrical resistance element in an electrical circuit, the material within the molds being heated for a period of time and at a temperature to coagulate the protein therein and produce permanent setting of such material into a multiplicity of rod-shaped formations, shifting said mold unit to an ejection station and simultaneously and longitudinally removing said rod formations from said multiplicity of tubular molds.

4. The process as set forth in claim 3 which further includes the inter-positioning of collection tray elements forwardly and longitudinally of corresponding ends of all of said tubular mold cavities and positioned to receive and support all of said pre-set rod formations when the latter are forced out of said cavities.

5. A continuing process for forming and at least partially cooking, in alternating cycles of operation, a multiplicity of elongate rod-shaped food products from a source of comminuted and flowable food material containing proteins, which process includes the steps of, first filling a multiplicity of clustered mold cavities of a multi-tubular first mold unit with said material, shifting said filled mold unit into a different station for material heating and partial cooking, closely containing the food material within said multiplicity of mold cavities with said mold unit stationary, while substantially uniformly heating said material throughout by means of electrical resistance heating wherein the material within each cavity constitutes an electrical resistance element in an electrical circuit, the material within the molds being heated for a period of time and at a temperature to at least partially coagulate the protein therein to produce permanent setting of such material into a multiplicity of rod-shaped formations, and during said heating step of the material of said first multi-tubular mold unit, filling a multiplicity of mold cavities of a second multiplicity mold unit, shifting said first mold unit to an ejection station and substantially simultaneously therewith shifting said second mold unit into said heating station, longitudinally removing said rod formations from said first mold unit while uniformly heating the material by means of electrical resistance heating wherein the material within each cavity constitutes an electrical resistance element in an electrical circuit, the material within the molds being heated for a period of time and at a temperature to coagulate the protein therein and produce permanent setting of such material into a multiplicity of rod-shaped formations.

6. In apparatus for forming and at least partially cooking in one cycle of operation, a large number of elongate rod-shaped food products from comminuted flowable food material containing protein, the combination of a multi-tubular mold unit having a multiplicity of clustered substantially parallel mold cavities, injector mechanism for simultaneously filling all of the mold cavities from a source of said flowable food material, said injector mechanism being shiftable from connected relation with said mold cavities, mechanism for simultaneously heating and at least partially cooking all of the material in said mold cavities through the medium of electrical resistance heating in which the material within each mold cavity constitutes an electrical resistance element in an electrical circuit while said material is immobile to at least partially coagulate the protein in the respective molds to thereby produce permanent setting of the material in rod formations, and mechanism for longitudinally ejecting said rod formations after setting thereof from said multi-tubular mold unit.

7. In treatment apparatus for forming and at least partially cooking in one cycle of operation a multiplicity of elongate rod-shaped food products from a common source of comminuted and flowable food material containing protein, the combination which comprises, a multi-product mold unit having a multiplicity of clustered tubular molds extending in generally parallel relation, structure for mounting said mold unit for travel between at least two treatment stations, mechanism at one of said stations for substantially uniformly and simultaneously filling all of said tubular molds from a source of material supply, power means for moving said mold unit to and between said stations, mechanism at a second treatment station for closing the ends of said tubular molds and applying inward pressure upon the food material contained therein and for also simultaneously heating the material contained in all of said tubular molds uniformly throughout through the medium of electrical resistance heating in which the material within each mold cavity constitutes an electrical resistance element in an electrical circuit to coagulate protein of the material and thereby produce permanent setting thereof in rod formations, and mechanism at another of said stations for simultaneously and longitudinally removing all of said rod-formations from said multiplicity of tubular molds.

8. In treatment apparatus for forming and at least partially cooking in one cycle of operation, a multiplicity of elongate rod-shaped food products from a common source of comminuted and flowable food material containing protein, the combination which comprises, a multi-product mold unit having a multiplicity of clustered tubular molds extending in generally parallel relation, structure for mounting said mold unit for travel between at least two treatment stations, mechanism at one of said stations for substantially uniformly and simultaneously filling all of said tubular molds from a source of material supply, mechanism at a second treatment station for simultaneously and uniformly heating throughout through the medium of electrical resistance heating in which the material within each mold cavity constitutes an electrical resistance element in an electrical circuit the material contained in all of said tubular molds to coagulate protein of such material and thereby produce permanent setting of such material in rod-shaped formations, and mechanism at one of said stations for simultaneously and longitudinally removing said rod formations from said multiplicity of tubular molds.

9. The structure set forth in preceding claim 8, and a tray mechanism for simultaneously receiving said longitudinally removed rod formations from said mold unit and mounted for travel to carry said products to a location removed from said apparatus.

10. In treatment apparatus for forming and at least partially cooking, in alternating cycles of operation, a multiplicity of elongate rod-shaped food products from a common source of comminuted and flowable food material containing protein, the combination which comprises a pair of similar multi-product mold units each having a multiplicity of tubular molds extending in general parallel relation, structure for mounting said mold units for alternating travel between respective first stations and a second station and thereafter back to said respective first stations, mechanism operatively associated with said first stations for substantially uniformly and simultaneously filling all of said tubular mold of each mold unit from a source of material supply, mechanism at a second common treatment station for simultaneously and uniformly heating throughout through the medium of electrical resistance heating in which the material within each mold cavity constitutes an electrical resistance element in an electrical circuit the material contained in all of said tubular molds of each mold unit to coagulate protein of such material and thereby produce permanent setting of such material in rod-shaped formation, power means for alternatively shifting said mold units from their respective first stations to the second common treatment station and for return to the first station so that one unit is at its associated first treament station while the other of said units is at the second station, and mechanism of each of the first stations for simultaneously and longitudinally removing said rod formations from said multiplicity of tubular molds and each mold unit when the latter is returned to its first station.

11. In apparatus for forming and at least partially cooking in one cycle of operation a large number of elongate rod-shaped food products from comminuted flowable food material containing protein, the combination of a multi-tubular mold unit constructed of non-conductive electrical material and having a multiplicity of clustered and substantially parallel mold cavities, ejector mechanism for simultaneously filling all of said mold cavities from a source of said flowable food material, said ejector mechanism being shiftable from connected relation with said mold cavities, electrical resistance heating mechanism connectible to a source of electrical power for heating the material within the mold cavities and including a plurality of electrodes arranged and axially spaced opposed pairs for engagement with opposite end portions of the material filling the mold cavities, the material within the cavities constituting electrical resistance elements in electrical circuits, each circuit including a series of said pairs of electrodes and the material within their associated mold cavities, said circuits when energized producing uniform heat and at least partially cooking all of the material in said several mold cavities while said material is immobile to at least partially coagulate the protein in the respective molds to thereby produce permanent setting of material in rod formations, electrical circuit controlling means for each of said circuits including heat responsive elements each contacting the material within the cavity of one of said circuits and being responsive to a predetermined temperature for causing de-energization of its associated circuit, and mechanism for longitudinally ejecting said rod formations after setting thereof from said multi-tubular mold unit.

12. In apparatus for forming and at least partially cooking in one cycle of operation a large number of elongate rod-shaped food products from comminuted flowable material containing protein, the combination of a multi-tubular mold unit having a plurality of clustered and substantially parallel mold cavities, injector mechanism for filling all of said mold cavities with flowable food material and including a plenum chamber having a plurality of tapered distributor passages and having a plurality of injector nozzles communicating with said passages and through which said flowable material is simultaneously discharged into all of said mold cavities, a main conduit means connectible to a source of said flowable food material and having a plurality of manifold end conduits communicating therewith and extending symmetrically and radially therefrom in communicating relation with said plenum chamber, manifold conduit comprising a common centrally located inlet for a series of said tapered distributor passages, said injector mechanism being shiftable from connected relation with said mold cavities, mechanism for producing uniform heating and at least partially cooking all of the material in said several mold cavities while said material is immobile through the medium of electrical resistance heating in which the material within each mold cavity constitutes an electrical resistance element in an electrical circuit to at least partially coagulate the protein in their respective molds to thereby produce a permanent setting of the material in rod formations, and mechanism for longitudinally ejecting said rod formations after setting thereof from said multi-tubular mold unit.

13. A structure as defined in claim 12 wherein each of said distributor passages comprised of a plurality of tapered facets.

14. In treatment apparatus for forming and at least partially cooking in one cycle of operation a multiplicity of elongate rod-shaped food products from a common source of comminuted and flowable food material containing protein, the combination which comprises, a multi-product mold unit having a multiplicity of clustered tubular molds extending in generally parallel relation, structure for mounting said mold unit for travel between at least two treatment stations, dual function injector and ejector mechanism at one of said stations including a plurality of elongate injector-ejector elements each being of a length substantially approximating the length of said tubular molds and being retractably shiftable from extended telescoping relation within the latter for simultaneously and uniformly filling all of the tubular molds from a source of flowable food material, mechanism at a second treatment station for closing the ends of said tubular molds and applying inward pressure upon the food materials contained therein and for also simultaneously heating the material contained in all of said tubular molds uniformly throughout through the medium of electrical resistance heating in which the material within each mold cavity constitutes an electrical resistance element in an electrical circuit to coagulate protein of the material and thereby produce permanent feeding thereof in rod formations, and said dual function injector and ejector mechanism when shifted to dispose said injector-ejector elements into extended telescopic relation with respect to their associated tubular molds serving to simultaneously and longitudinally remove all of said rod formation from said multiplicity of tubular molds.

15. An apparatus for forming and at least partially cooking in one cycle of operation, a large number of elongate rod-shaped food products from comminuted flowable food material containing protein, the combination of a multi-tubular mold unit having a multiplicity of clustered substantially parallel mold cavities, injector mechanism for simultaneously filling all of the mold cavities from a source of said flowable food material, said injector mechanism being shiftable from connected relation with said mold cavities, mechanism for simultaneously heating and at least partially cooking the material in all of said mold cavities, said heating mechanism being operable to heat all of the material in each mold cavity simultaneously while said material is immobile through the medium of electrical resistance heating in which the material within each mold cavity constitutes an electrical resistance element in an electrical circuit to at least partially coagulate the protein uniformly in each respective mold to thereby produce permanent setting of the material in rod formations, and mechanism for longitudinally ejecting said rod formations after setting thereof from said multi-tubular mold unit.

References Cited in the file of this patent
UNITED STATES PATENTS

| | | |
|---|---|---|
| 2,623,451 | Probaska | Dec. 30, 1952 |
| 2,860,991 | Christianson et al. | Nov. 18, 1958 |
| 2,897,745 | Nichols et al. | Aug. 4, 1959 |
| 2,965,491 | Clemens et al. | Dec. 20, 1960 |